US012586588B2

(12) United States Patent
Yamada

(10) Patent No.: US 12,586,588 B2
(45) Date of Patent: Mar. 24, 2026

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventor: Kaori Yamada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 18/499,284

(22) Filed: Nov. 1, 2023

(65) Prior Publication Data

US 2024/0212686 A1 Jun. 27, 2024

(30) Foreign Application Priority Data

Dec. 22, 2022 (JP) ................................ 2022-205700

(51) Int. Cl.
*G10L 15/32* (2013.01)
*G10L 15/22* (2006.01)

(52) U.S. Cl.
CPC .............. *G10L 15/32* (2013.01); *G10L 15/22* (2013.01); *G10L 2015/223* (2013.01)

(58) Field of Classification Search
CPC ... G10L 15/32; G10L 15/22; G10L 2015/223; B60R 16/037; B60W 50/10; B60W 30/14; G06F 3/167
See application file for complete search history.

(56) References Cited

U.S. PATENT DOCUMENTS

| | | | | |
|---|---|---|---|---|
| 11,587,366 B1 * | 2/2023 | Chan | ...................... | H04L 41/145 |
| 2015/0325064 A1 * | 11/2015 | Downey | ................ | G05D 1/226 |
| | | | | 701/29.3 |
| 2019/0187953 A1 * | 6/2019 | Kozuka | ................... | G06F 3/162 |
| 2020/0135193 A1 | 4/2020 | Hayashi | | |
| 2020/0202855 A1 | 6/2020 | Kozono et al. | | |
| 2022/0063497 A1 * | 3/2022 | Pedersen | ................. | G10L 15/26 |
| 2023/0356728 A1 * | 11/2023 | Jain | ......................... | G06F 3/013 |
| 2024/0051565 A1 * | 2/2024 | Ito | ......................... | B60W 50/14 |
| 2024/0416907 A1 * | 12/2024 | Barrera | ........... | B60W 30/18163 |
| 2025/0083680 A1 * | 3/2025 | Low | ...................... | B60N 2/0022 |
| 2025/0091596 A1 * | 3/2025 | Xiao | ...................... | G06V 20/58 |

FOREIGN PATENT DOCUMENTS

| | | | | | |
|---|---|---|---|---|---|
| CN | 104078046 | A | * | 10/2014 | ......... B60R 16/0373 |
| CN | 110060660 | A | * | 7/2019 | ............. G10L 15/01 |
| EP | 3944232 | A1 | * | 1/2022 | ......... B60W 60/001 |
| JP | 2002-318843 | A | | 10/2002 | |
| JP | 2020-069920 | A | | 5/2020 | |
| JP | 2020-097378 | A | | 6/2020 | |
| JP | 2021-148971 | A | | 9/2021 | |
| WO | WO-2023075964 | A1 | * | 5/2023 | ............. B64D 31/16 |

* cited by examiner

*Primary Examiner* — Mohammad K Islam

(74) *Attorney, Agent, or Firm* — Sughrue Mion, PLLC

(57) ABSTRACT

A control unit of an information processing apparatus is configured to acquire a speech including a request of a user. The control unit of the information processing apparatus is configured to specify one or multiple devices and at least two functions to be executed by the one or multiple devices, for realizing the request of the user based on the acquired speech of the user. The control unit of the information processing apparatus is configured to cause the one or multiple devices to execute the at least two functions.

17 Claims, 5 Drawing Sheets

CORRESPONDENCE INFORMATION

| REQUEST | DEVICE | FUNCTION | RISK LEVEL | ALTERNATIVE |
|---------|--------|----------|------------|-------------|
| ✳✳✳ | ✳✳✳ | ✳✳✳ | ✳✳✳ | ✳✳✳ |
|  | ∎∎∎ | ∎∎∎ | ∎∎∎ |  |
|  | ✳✳✳ | ✳✳✳ | ✳✳✳✳ |  |
| ∎∎∎ | ∎∎∎ | ∎∎∎ | ∎∎∎ | ∎∎∎ |

INFORMATION PROCESSING APPARATUS, INFORMATION PROCESSING METHOD, AND NON-TRANSITORY STORAGE MEDIUM

CROSS-REFERENCE TO RELATED APPLICATION

This application claims priority to Japanese Patent Application No. 2022-205700 filed on Dec. 22, 2022, incorporated herein by reference in its entirety.

BACKGROUND

1. Technical Field

The disclosure relates to an information processing apparatus, an information processing method, and a non-transitory storage medium.

2. Description of Related Art

Japanese Unexamined Patent Application Publication No. 2021-148971 (JP 2021-148971 A) describes a voice recognition method using a voice recognition apparatus that receives a control request to a device mounted on a mobile object based on instructions with a voice issued by a user. In the voice recognition method described in JP 2021-148971 A, the voice recognition apparatus acquires a voice, converts the voice acquired to voice data, and acquires information on the status of the mobile object. In the voice recognition method, the voice recognition apparatus estimates a sound collection environment where a voice is acquired, based on the information on the status of the mobile object. In the voice recognition method, the voice recognition apparatus sets a detection mode for identifying a control request corresponding to the voice data according to the sound collection environment. In the voice recognition method, the voice recognition apparatus analyzes the voice data based on the detection mode set, and identifies a device to be operated, which is an object to be controlled, and the control request to the device to be operated.

SUMMARY

The disclosure improves user convenience.

A first aspect of the disclosure relates to an information processing apparatus. The information processing apparatus includes a control unit. The control unit is configured to acquire a speech including a request of a user, specify one or multiple devices and at least two functions to be executed by the one or multiple devices, for realizing the request of the user based on the acquired speech of the user, and cause the one or multiple devices to execute the at least two functions.

A second aspect of the disclosure relates to an information processing method that is executed by a computer. The information processing method includes acquiring a speech including a request of a user, specifying one or multiple devices and at least two functions to be executed by the one or multiple devices, for realizing the request of the user based on the acquired speech of the user, and causing the one or multiple devices to execute the at least two functions.

A third aspect of the disclosure relates to a non-transitory storage medium storing instructions that are executable by one or more processors and that cause the one or more processors to perform an information processing method.

The information processing method includes acquiring a speech including a request of a user, specifying one or multiple devices and at least two functions to be executed by the one or multiple devices, for realizing the request of the user based on the acquired speech of the user, and causing the one or multiple devices to execute the at least two functions.

According to the aspects of the disclosure, user convenience is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram that schematically shows an example of the functional configuration of a first device;

FIG. 3 is a table that shows an example of the table configuration of correspondence information;

DETAILED DESCRIPTION OF EMBODIMENTS

It is assumed that an information processing apparatus is capable of causing a device to execute only one function in response to a speech made by a user. It is also assumed that, to realize a request of the user, one of one or multiple devices needs to be caused to execute at least two functions. In this case, the user at least needs to make a speech the same number of times as the number of functions to be executed to realize the request of the user. Therefore, when the user needs to make a speech multiple times when the user needs to cause one or multiple devices to execute multiple functions to realize his or her own request. For this reason, the user may feel burdensome. The information processing apparatus according to the first aspect of the disclosure solves the inconvenience.

A control unit of the information processing apparatus according to the first aspect of the disclosure acquires a speech including a request of a user. The control unit of the information processing apparatus specifies one or multiple devices for realizing the request of the user based on the acquired speech of the user. The control unit of the information processing apparatus specifies at least two functions to be executed by the one or multiple devices, for realizing the request of the user based on the acquired speech of the user. The control unit of the information processing apparatus causes the one or multiple devices specified to execute the at least two functions specified.

As described above, when the user makes a speech including his or her own request, the information processing apparatus is capable of causing the one or multiple devices to execute the at least two functions for realizing the request of the user. Thus, in order to cause one or multiple devices to execute at least two functions, the user does not need to make a speech multiple times for causing the devices to execute the corresponding functions. As a result, it is possible to improve user convenience.

Hereinafter, a specific embodiment of the disclosure will be described with reference to the accompanying drawings. The dimensions, materials, and shapes of components described in the present embodiment, the arrangement of the components, and the like do not intend to limit the technical scope of the disclosure to them unless otherwise specified.

EMBODIMENT

Outline of System

Figure 1:
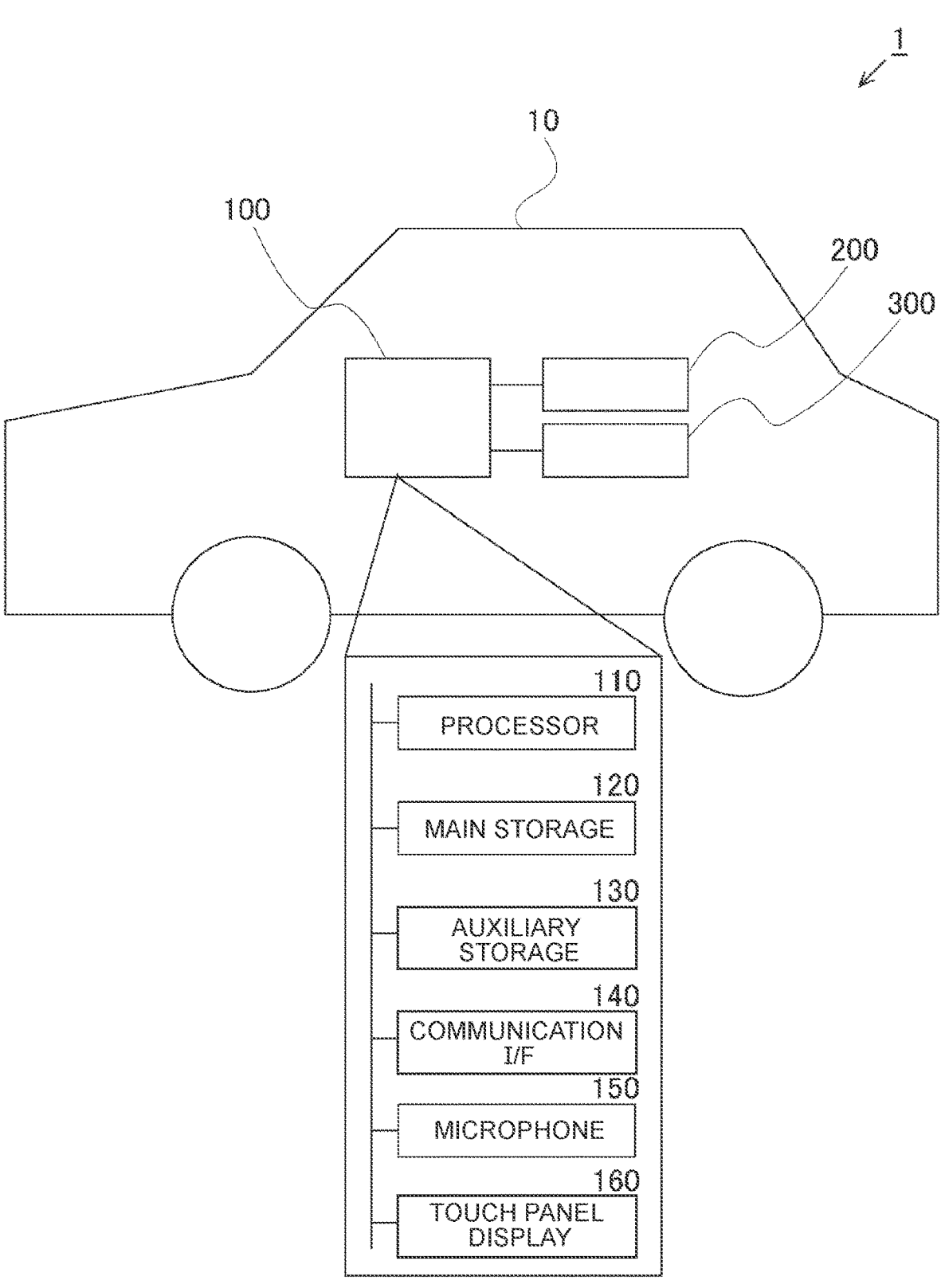
FIG. 1 is a diagram that shows the schematic configuration of a vehicle system.

A vehicle system 1 according to the present embodiment will be described with reference to FIG. 1. FIG. 1 is a diagram that shows the schematic configuration of the vehicle system 1. The vehicle system 1 is configured to include a first device 100, a second device 200, and a third device 300. In the vehicle system 1, the first device 100, the second device 200, and the third device 300 are connected to one another by an in-vehicle network.

Second Device

The second device 200 is a device mounted on a vehicle 10. In the present embodiment, the second device 200 is an electronic control unit (ECU) that controls travel of the vehicle 10. The second device 200 is configured to be capable of executing a function to semi-autonomously drive the vehicle 10 (cruise control function). When a drive mode of the vehicle 10 is switched to a cruise control mode, the second device 200 is allowed to start semi-autonomous driving of the vehicle 10.

Third Device

The third device 300 is a device mounted on the vehicle 10. In the present embodiment, the third device 300 is an atomizer. The third device 300 is capable of executing a function to atomize fragrance into the vehicle 10 to fill the vehicle 10 with a scent of fragrance. The third device 300 is capable of atomizing multiple types of fragrance. In the present embodiment, the third device 300 has fragrance to be atomized during normal times (hereinafter, which may be referred to as "first fragrance") and fragrance atomized when the user of the vehicle 10 wants to be relaxed (hereinafter, which may be referred to as "second fragrance"). The third device 300 is capable of switching atomized fragrance between the first fragrance and the second fragrance.

First Device

The first device 100 is a device mounted on the vehicle 10. The first device 100 causes each of multiple devices mounted on the vehicle 10 to execute a corresponding executable function based on a speech from the user of the vehicle 10. The user of the vehicle 10 (hereinafter, which may be simply referred to as "user") is an occupant of the vehicle 10. Here, the multiple devices mounted on the vehicle 10 include the second device 200 and the third device 300. The first device 100 causes the second device 200 to execute a function executable by the second device 200, based on a speech of the user. The first device 100 also causes the third device 300 to execute a function executable by the third device 300, based on a speech of the user.

Here, it is assumed that the first device 100 is capable of causing a device to execute only one function for a speech made by the user. In this case, the user may want to reduce fatigue during driving. In this case, it is assumed that the drive mode of the vehicle 10 needs to be changed to the cruise control mode to realize the request of the user. In addition, it is assumed that the fragrance to be atomized into the vehicle 10 needs to be changed from the first fragrance to the second fragrance to realize the request of the user.

In this case, the user makes a speech to require the first device 100 to change the drive mode of the vehicle 10 to the cruise control mode. As a result, the first device 100 instructs the second device 200 to change the drive mode of the vehicle 10 to the cruise control mode in response to the speech of the user. The user also makes a speech to require the first device 100 to change the fragrance atomized into the vehicle 10 from the first fragrance to the second fragrance. As a result, the first device 100 instructs the third device 300 to change the fragrance atomized into the vehicle 10 from the first fragrance to the second fragrance in response to the speech of the user. In this way, the request of the user is realized.

In this way, when the first device 100 causes a device to execute only one function in response to a speech made by the user, the user needs to make two speeches to realize a desire to reduce fatigue during driving of the vehicle 10. As a result, when multiple functions need to be executed for the user to realize his or her own request, the user needs to make multiple speeches. For this reason, the user may feel burdensome. The user possibly does not know that there are multiple functions to reduce his or her fatigue.

In the present embodiment, the first device 100 specifies at least two devices for realizing a request of the user from among the multiple devices mounted on the vehicle 10 based on a speech including the request of the user. The first device 100 specifies functions to be respectively executed by the specified at least two devices based on the speech including the request of the user.

In the present embodiment, when the user makes a speech about a request to reduce fatigue during driving, the first device 100 specifies the second device 200 and the third device 300 as devices for realizing the request of the user. The first device 100 specifies the function to change the drive mode of the vehicle 10 to the cruise control mode as a function for realizing the request of the user. In addition, the first device 100 specifies the function to change the fragrance atomized into the vehicle 10 from the first fragrance to the second fragrance as a function for realizing the request of the user. The first device 100 causes the second device 200 to change the drive mode of the vehicle 10 to the cruise control mode. In addition, the first device 100 causes the third device 300 to change the fragrance atomized from the first fragrance to the second fragrance. In this way, the first device 100 realizes the request of the user.

The first device 100 includes a computer including a processor 110, a main storage 120, an auxiliary storage 130, a communication interface (communication I/F) 140, a microphone 150, and a touch panel display 160. The processor 110 is, for example, a central processing unit (CPU) or a digital signal processor (DSP). The main storage 120 is, for example, a random access memory (RAM). The auxiliary storage 130 is, for example, a read only memory (ROM). The auxiliary storage 130 is also, for example, a hard disk drive (HDD) or a disk recording medium, such as a CD-ROM, a DVD, and a Blu-ray disc. The auxiliary storage 130 may be a removable medium (portable storage medium). For example, a USB flash drive or an SD card is illustrated as the removable medium. The communication I/F 140 is, for example, a local area network (LAN) interface board. The microphone 150 is a microphone provided in the vehicle 10. The touch panel display 160 is a touch panel provided in the vehicle 10.

In the first device 100, an operating system (OS), various programs, various information tables, and the like are stored in the auxiliary storage 130. In the first device 100, the processor 110 is capable of implementing various functions as will be described later by loading the programs stored in the auxiliary storage 130 onto the main storage 120 and then running the loaded programs. One, some, or all of the functions in the first device 100 may be implemented by a hardware circuit, such as an ASIC and an FPGA. The first device 100 does not necessarily need to be implemented by a single physical component and may be made up of a plurality of computers that cooperate with each other. The second device 200 and the third device 300 each include a computer as in the case of the first device 100.

Functional Configuration

Figure 2:
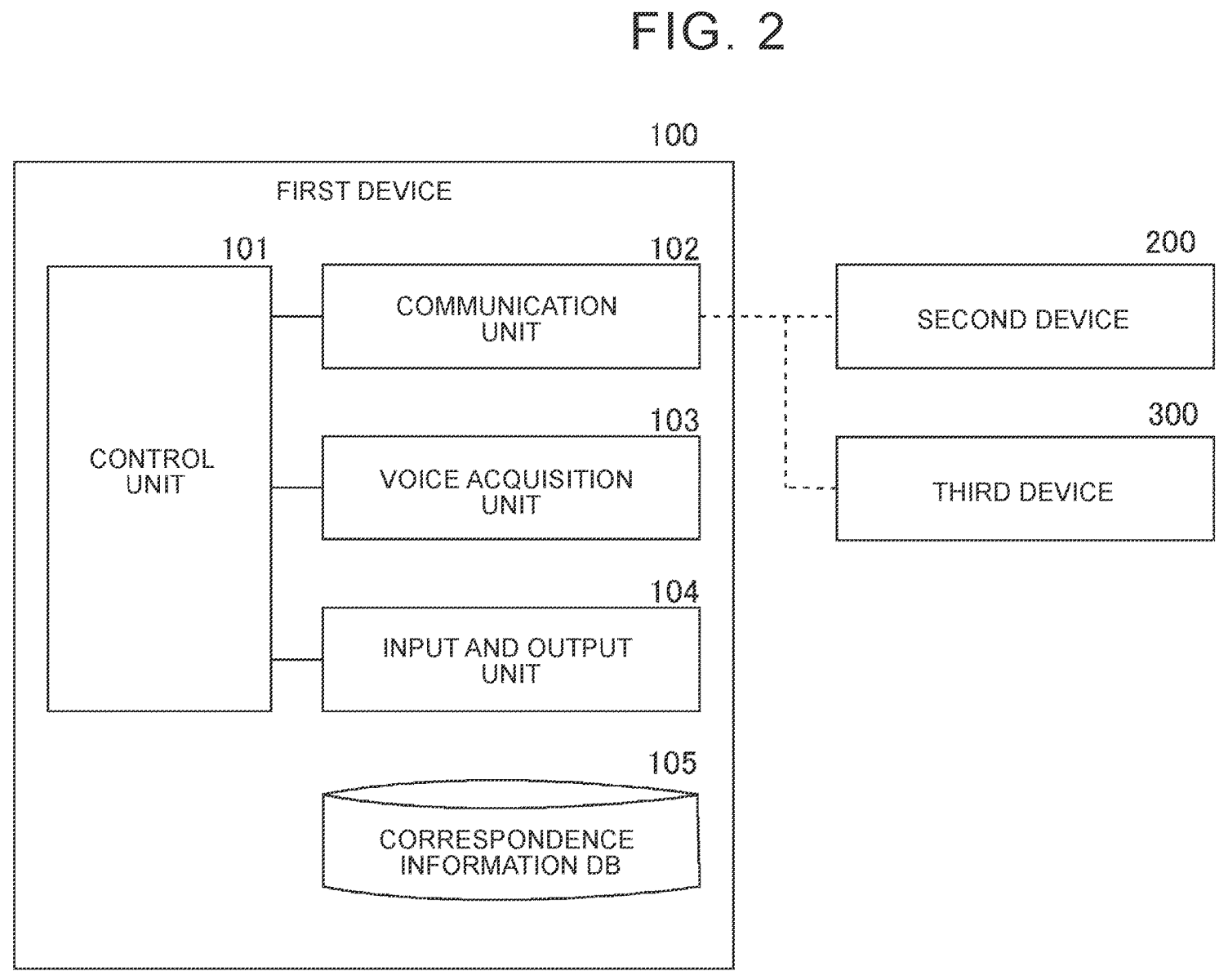

Next, the functional configuration of the first device 100 that is a component of the vehicle system 1 according to the present embodiment will be described with reference to FIG. 2 and FIG. 3. FIG. 2 is a block diagram that schematically shows an example of the functional configuration of the first device 100. The first device 100 includes a control unit 101, a communication unit 102, a voice acquisition unit 103, an input and output unit 104, and a correspondence information database (correspondence information DB) 105.

The control unit 101 has a function to perform arithmetic processing for controlling the first device 100. The control unit 101 can be implemented by the processor 110 in the first device 100. The communication unit 102 has a function to connect the first device 100 to the in-vehicle network. The communication unit 102 is implemented by the communication I/F 140 in the first device 100.

The voice acquisition unit 103 has a function to acquire a speech of the user. The voice acquisition unit 103 is implemented by the microphone 150 in the first device 100. The voice acquisition unit 103 converts a speech of the user to voice data. The voice acquisition unit 103 sends the voice data converted from the speech of the user (hereinafter, which may be simply referred to as "voice data") to the control unit 101. The control unit 101 identifies a request of the user based on the voice data acquired.

The correspondence information DB 105 has a function to hold correspondence information. The correspondence information is information for associating a request of a user, a device for realizing the request of the user, and a function for realizing the request of the user with one another. The correspondence information DB 105 may be implemented by the auxiliary storage 130 of the first device 100. FIG. 3 is a table that shows an example of the table configuration of correspondence information. As shown in FIG. 3, the correspondence information has a request field, a device field, a function field, a risk level field, and an alternative field.

Information that indicates a request of the user is stored in the request field. An identifier (request ID) corresponding to the request of the user is stored in the request field. When the request of the user coincides with a request indicated by the request ID stored in the request field, information on the device for realizing the request of the user is stored in the device field. An identifier (device ID) corresponding to information on the device for realizing the request of the user is stored in the device field. Information about the function to be executed by the device for realizing the request of the user is stored in the function field. An identifier (function ID) corresponding to the function to be executed by the device for realizing the request of the user is stored in the function field.

Information that indicates the level of risk the function corresponding to the function ID stored in the function field poses to the vehicle 10 when the function is executed is entered in the risk level field. As the risk posed to the vehicle 10 increases, the level of risk (hereinafter, which may be simply referred to as "risk level") entered in the risk level field is configured to further increase.

Information about an alternative to be proposed to the user to realize the request of the user when the function corresponding to the function ID and stored in the function field cannot be executed by the corresponding device is stored in the alternative field. The details of an alternative to be proposed to the user will be described later.

When the first device 100 causes multiple devices to execute associated functions to realize a request of the user, multiple device IDs are stored in the device field corresponding to a request ID stored in the request field in the correspondence information. When the first device 100 causes one device to execute a function to realize a request of the user, one device ID is stored in the device field corresponding to a request ID stored in the request field.

The control unit 101 consults the correspondence information held in the correspondence information DB 105 based on an identified request of the user. The control unit 101 identifies a request ID corresponding to the request of the user in the correspondence information. The control unit 101 acquires a device ID and a function ID corresponding to the request ID identified.

The control unit 101 determines whether the function corresponding to the identified function ID is executable. When the control unit 101 determines that the function corresponding to the function ID identified is not executable, the control unit 101 outputs proposal information. Here, proposal information is information proposing an alternative for satisfying a request of the user. The control unit 101 outputs proposal information based on information about an alternative stored in the alternative field in the correspondence information held in the correspondence information DB 105.

The control unit 101 may output proposal information when any one of at least two functions for realizing a request of the user is not executable. In this case, the control unit 101 may output instruction information regarding one or multiple functions executable of at least two functions for realizing the request of the user and send the instruction information to the corresponding one or multiple devices. The control unit 101 may output proposal information only when all the functions of at least two functions for realizing the request of the user are not executable.

When the request of the user is to reduce fatigue during driving, the function to change the drive mode of the vehicle 10 to the cruise control mode is a function that realizes the request of the user. In addition, the function to change the fragrance atomized into the vehicle 10 from the first fragrance to the second fragrance is also a function that realizes the request of the user.

On the other hand, at the point in time when the user makes a speech on a request to reduce fatigue during driving, the drive mode of the vehicle 10 can be already the cruise control mode. In this cases, the function to change the drive mode of the vehicle 10 to the cruise control mode is not executable.

At this point in time, the fragrance atomized into the vehicle 10 can be already the second fragrance. Also, the remaining amount of the second fragrance can be empty. In these cases, the function to change the fragrance atomized into the vehicle 10 from the first fragrance to the second fragrance is not executable.

In this way, when the second device 200 or the third device 300 cannot execute the function to realize the request of the user, the control unit 101 outputs proposal information. The control unit 101 sends the proposal information to the input and output unit 104.

The control unit 101 acquires a risk level corresponding to the identified function ID. The control unit 101 determines whether the risk level acquired is higher than or equal to a predetermined level. Here, the predetermined level is a level at which it is presumable that the risk posed to the vehicle 10 is high enough. The control unit 101 outputs confirmation information when the risk level acquired is higher than or equal to the predetermined level. Here, confirmation information is information for confirming the user whether to execute the function of which the risk level is higher than or equal to the predetermined level. The control unit 101 sends the confirmation information to the input and output unit 104.

When the request of the user is to reduce fatigue during driving, the first device 100 causes the second device 200 to execute the function to change the drive mode of the vehicle 10 to the cruise control mode. In this case, when the second device 200 executes the function to change the drive mode of the vehicle 10 to the cruise control mode, the risk can increase while the vehicle 10 is traveling. In other words, the risk level in a case where the second device 200 executes the function to change the drive mode of the vehicle 10 to the cruise control mode can be higher than or equal to the predetermined level. In this case, the control unit 101 outputs confirmation information to confirm the user whether to cause the second device 200 to execute the function to change the drive mode of the vehicle to the cruise control mode.

The vehicle 10 can be present at a location (for example, an urban area or the like) where it is not suitable for use of the cruise control mode. At this time, when the second device 200 executes the function to change the drive mode of the vehicle 10 to the cruise control mode, it may be estimated that the risk posed to the vehicle 10 can be high enough. On the other hand, the vehicle 10 can be present at a point where it is suitable for use of the cruise control mode, such as on an expressway. In this case, even when the second device 200 executes the function to change the drive mode of the vehicle 10 to the cruise control mode, it is estimated that the risk posed to the vehicle 10 is small. For this reason, between when the vehicle 10 is present in an urban area and when the vehicle 10 is present on an expressway, the risk level of the function that the second device 200 changes the drive mode of the vehicle 10 to the cruise control mode may be varied. In this way, a different level may be set as a risk level according to the situation of the vehicle 10.

On the other hand, when the third device 300 executes the function to change the fragrance atomized into the vehicle 10 from the first fragrance to the second fragrance, it is estimated that no risk is posed to the vehicle 10. For this reason, the first device 100 does not need to output confirmation information as to whether to cause the third device 300 to execute the function to change the fragrance atomized into the vehicle 10 from the first fragrance to the second fragrance. At this time, the control unit 101 may output only the instruction information for causing the third device 300 to execute the function to change the fragrance atomized into the vehicle 10 from the first fragrance to the second fragrance and send the instruction information to the third device 300.

Here, when the user takes a break as needed, it is possible to reduce the fatigue of the user. Therefore, the control unit 101 outputs proposal information proposing taking a break as needed to the user as an alternative. The control unit 101 may acquire a scheduled travel route of the vehicle 10 and propose, to the user, a place where the user is able to take a break on the scheduled travel route.

The input and output unit 104 has a function for the user to input various pieces of information to the first device 100. The input and output unit 104 has a function to display various pieces of information for the user. The input and output unit 104 may be implemented by the touch panel display 160 of the first device 100.

The input and output unit 104 receives confirmation information from the control unit 101. The input and output unit 104 displays the confirmation information received for the user. The user inputs, to the input and output unit 104, an answer to the confirmation information displayed. In other words, the user inputs, to the input and output unit 104, an answer as to whether to execute the function of which the risk level is higher than or equal to the predetermined level. The input and output unit 104 sends, to the control unit 101, answer information about the answer to the confirmation information input by the user. The control unit 101 determines whether to execute the function of which the risk level is higher than or equal to the predetermined level, based on the answer information.

When the request of the user is to reduce fatigue during driving, the control unit 101 sends the second device 200 via the communication unit 102 instruction information instructing the second device 200 to change the drive mode of the vehicle 10 to the cruise control mode. In the present embodiment, when the answer information is information permitting the second device 200 to change the drive mode of the vehicle 10 to the cruise control mode, the control unit 101 sends instruction information to the second device 200. The second device 200 changes the drive mode of the vehicle 10 to the cruise control mode based on the instruction information. In addition, the control unit 101 sends the third device 300 via the communication unit 102 instruction information instructing the third device 300 to change the fragrance atomized into the vehicle 10 from the first fragrance to the second fragrance. Thus, the third device 300 changes the fragrance atomized into the vehicle 10 from the first fragrance to the second fragrance based on the instruction information. In this way, the request of the user is realized.

The input and output unit 104 receives proposal information from the control unit 101. The input and output unit 104 displays the proposal information received for the user. With this configuration, the user is able to learn that the request of the user can be realized by the alternative proposed by the proposal information.

First Process

Figure 4:
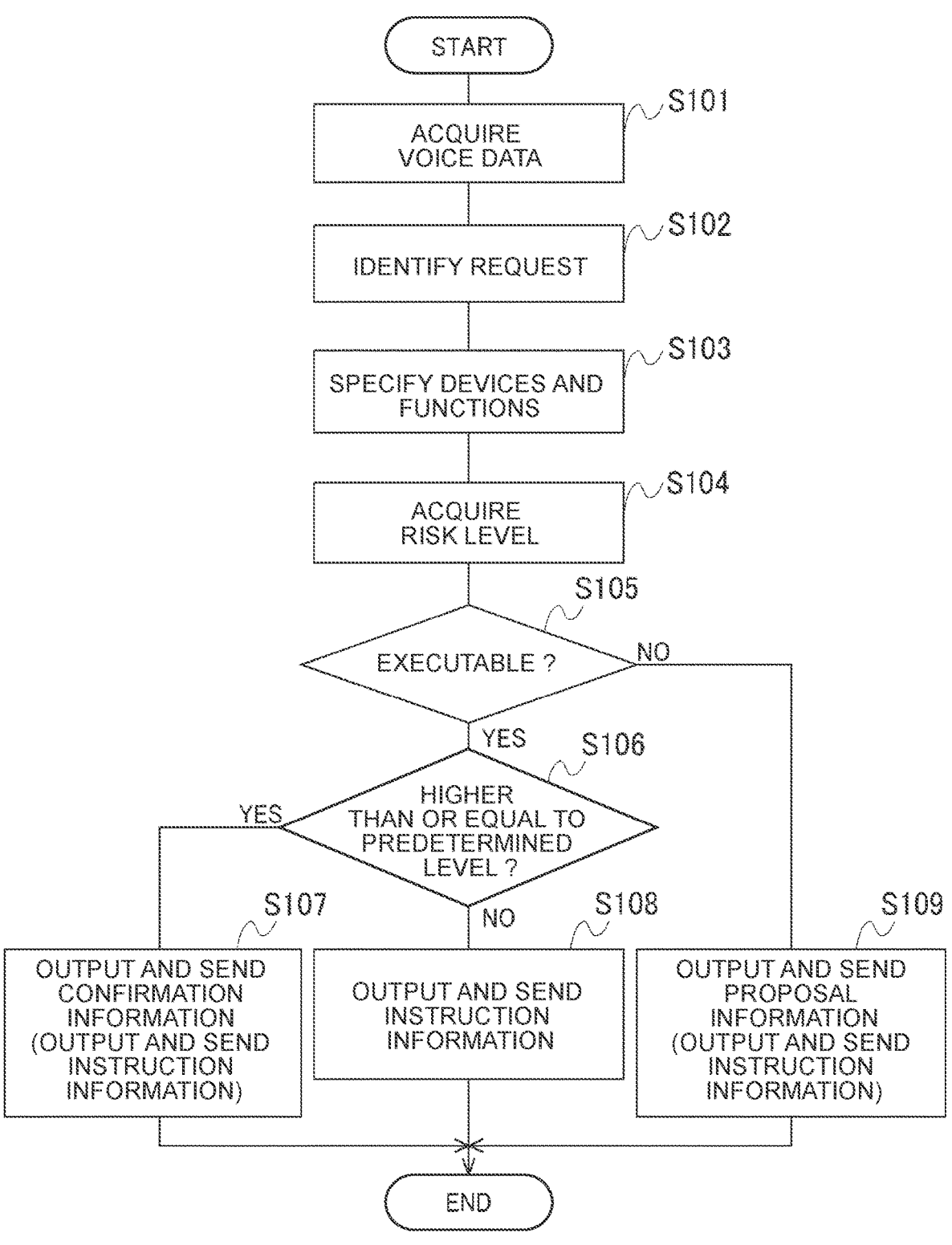
FIG. 4 is a flowchart of a first process that is executed by a control unit.

Next, a first process that is executed by the control unit 101 of the first device 100 in the vehicle system 1 will be described with reference to FIG. 4. FIG. 4 is a flowchart of the first process that is executed by the control unit 101. The first process is a process to output confirmation information, instruction information, or proposal information based on a speech including a request of the user. The first process starts to be executed when the user makes a speech of his or her own request to the first device 100.

In the first process, initially in S101, the control unit 101 acquires voice data. Subsequently, in S102, the control unit 101 identifies a request of the user based on the voice data. Subsequently, in S103, the control unit 101 specifies devices and functions for realizing the request of the user based on the request of the user and the correspondence information held in the correspondence information DB 105. In S104, the control unit 101 acquires the risk level posed to the vehicle 10 when each of the devices specified executes a corresponding one of the functions specified based on the correspondence information held in the correspondence information DB 105.

Subsequently, in S105, the control unit 101 determines whether each of the devices specified can execute a corresponding one of the functions specified. When the determination is negative in S105, each of the devices specified cannot execute a corresponding one of the functions specified. Therefore, the request of the user cannot be realized. Then, in S109, the control unit 101 outputs proposal information. In S109, the control unit 101 sends the proposal information to the input and output unit 104. With this configuration, the user is able to learn that his or her request can be realized by performing an alternative. As a result, the request of the user can be realized with a method other than executing the function with the device mounted on the vehicle 10. Also, in S109, the control unit 101 outputs instruction information regarding functions executable of the multiple functions and sends the instruction information to the corresponding devices. Then, the control unit 101 ends the first process.

When the determination is affirmative in S105, the control unit 101 executes the process of S106. In S106, the control unit 101 determines whether the risk level of each of the devices specified and a corresponding one of the functions specified is higher than or equal to the predetermined level. When multiple devices respectively execute multiple functions to realize the request of the user, the control unit 101 determines whether the risk level in the case where each of the devices executes a corresponding one of the functions is higher than or equal to the predetermined level.

When the determination is affirmative in S106, the control unit 101 needs to confirm the user about whether to execute the function of which the risk level is higher than or equal to the predetermined level. Therefore, in S107, the control unit 101 outputs confirmation information. In S107, the control unit 101 sends the confirmation information to the input and output unit 104. The user answers to the confirmation information via the input and output unit 104. Then, a second process is executed. In S107, the control unit 101 outputs instruction information regarding functions of which the risk level is lower than the predetermined level of the multiple functions and sends the instruction information to the corresponding devices. Then, the control unit 101 ends the first process. The details of the second process will be described later.

Figure 5:
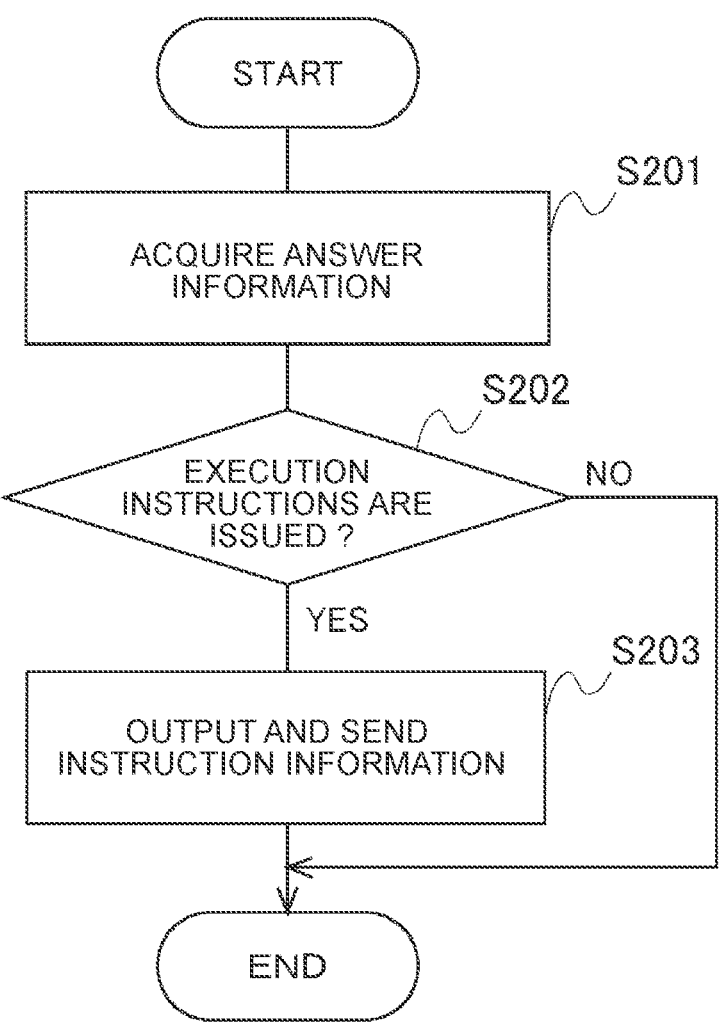
FIG. 5 is a flowchart of a second process that is executed by the control unit.

When the determination is negative in S106, the control unit 101 outputs instruction information in S108. In S108, the control unit 101 sends the instruction information to each of the devices specified via the in-vehicle network. At this time, the instruction information is sent to at least two devices each of which can execute a corresponding one of the functions and the risk level of which is lower than the predetermined level. In this way, the request of the user is realized. Then, the control unit 101 ends the first process.
Second Process The second process that is executed by the control unit 101 of the first device 100 in the vehicle system 1 will be described with reference to FIG. 5. FIG. 5 is a flowchart of the second process that is executed by the control unit 101. The second process is a process to, after the confirmation information is sent to the input and output unit 104, determine whether to output instruction information based on an answer from the user. The second process starts to be executed when the user inputs an answer to the confirmation information to the input and output unit 104.

In the second process, initially, in S201, the control unit 101 acquires answer information from the input and output unit 104. Subsequently, in S202, the control unit 101 determines whether the user provides, through the answer information, instructions to execute the functions of which the risk level is higher than or equal to the predetermined level. When the determination is negative in S202, the vehicle 10 does not permit execution of the functions of which the risk level is higher than or equal to the predetermined level, so the process is ended. When the determination is affirmative in S202, the control unit 101 outputs instruction information on the functions of which the risk level is higher than or equal to the predetermined level in S203. In S204, the control unit 101 sends the instruction information to the corresponding devices. Then, the process is ended.

The confirmation information is sent to the input and output unit 104 in the first process, and it is determined whether the user permits execution of the functions of which the risk level is higher than or equal to the predetermined level in the second process. With this configuration, it is possible to suppress automatic execution of the functions of which the risk level posed to the vehicle 10 is higher than or equal to the predetermined level. As a result, it is possible to ensure the safety of the vehicle 10.

As described above, with the information processing apparatus, it is possible to cause one or multiple devices to execute at least two functions for realizing a request of a user with a speech including his or her own request of the user. Thus, it is not required to make a speech multiple times for causing the devices to execute the corresponding functions in order to cause the devices to execute at least two functions. As a result, it is possible to improve user convenience.
First Modification In the present embodiment, when the request of the user is to reduce fatigue during driving, the first device 100 causes two devices, that is, the second device 200 and the third device 300, to execute two functions. However, the first device 100 does not need to cause two devices to execute two functions based on the request of the user. The first device 100 may cause a device to execute two or more functions based on the request of the user.

It is assumed that the request of the user is to cool the inside of the vehicle 10. In this case, the first device 100 acquires a speech of the user making a request to cool the inside of the vehicle 10. The first device 100 specifies an air conditioner mounted on the vehicle 10 as a device for realizing the request of the user based on the speech of the user.

The first device 100 specifies the function to decrease a set temperature of the air conditioner as the function to be executed by the air conditioner to realize the request of the user based on the speech of the user. The first device 100 also specifies the function to increase the volume of air of the air conditioner as the function to be executed by the air conditioner to realize the request of the user based on the speech of the user. In this way, the first device 100 specifies two functions, that is, the function to decrease the set temperature of the air conditioner and the function to increase the volume of air of the air conditioner, as the functions for realizing the request of the user based on the speech of the user.

In this case, the set temperature of the air conditioner can be already a minimum temperature or the volume of air of the air conditioner can be maximum. In this case, the first device 100 proposes to visit a place where cool beverages can be provided as proposal information.

In this way, when the request of the user is to cool the inside of the vehicle 10, the user is able to cause the air conditioner to execute two functions for realizing his or her own request by making a speech making a request to cool the inside of the vehicle 10. Thus, the user does not need to make two speeches, that is, a speech for instructions to decrease the set temperature of the air conditioner and a speech for instructions to increase the volume of air of the air conditioner. As a result, it is possible to improve user convenience. Second Modification In the present embodiment, the first device 100 is a device mounted on the vehicle 10. The first device 100 sends instruction information and the like to devices mounted on the vehicle 10. However, the first device 100 does not always need to be a device mounted on the vehicle 10. The first device 100 does not need to send instruction information and the like to devices mounted on the vehicle 10. The first device 100 may be, for example, a device installed in a facility concerned with the user. In this case, the first device 100 sends instruction information and the like to the device installed in the facility concerned with the user. Examples of the facility concerned with the user include a home of the user and a workplace of the user.

For example, it is assumed that the request of the user is to increase the temperature in a facility. In this case, the user makes a speech to the first device 100 of a request to increase the temperature in the facility. The first device 100 specifies an air conditioner and a space heater in the facility as two devices for realizing the request of the user based on the speech of the user. The first device 100 specifies a function to start up a heating mode of the air conditioner and a function to start up the space heater as two functions for realizing the request of the user based on the speech of the user. Then, the first device 100 sends instruction information to the air conditioner and the space heater.

In this case, when the heating mode of the air conditioner is already started up and the set temperature is maximum, it is not possible to cause the air conditioner to execute the function for realizing the request of the user. When the space heater is already started up, it is not possible to cause the space heater to execute the function for realizing the request of the user. Therefore, in these cases, the first device 100 outputs proposal information. The proposal information is, for example, information proposing to warm him or herself with a method other than the air conditioner or the space heater. Examples of the method other than the air conditioner or the space heater include overdressing.

In this case, when the function to start up the space heater is executed, there are concerns about risk on fire in the facility. For this reason, the first device 100 may determine that the risk level in the case of executing the function to start up the space heater is higher than or equal to the predetermined level. In this case, the first device 100 outputs confirmation information confirming whether the space heater is allowed to start up.

In this way, even when the first device 100 causes a device other than the device mounted on the vehicle 10 to execute a function, it is possible to improve user convenience.

OTHER EMBODIMENTS

The above-described embodiment is only illustrative, and the disclosure can be implemented with modifications as needed without departing from the purport of the disclosure. The processes and devices described in this disclosure may be freely implemented in combination without any technical contradiction.

A process described as the one that is performed by a device may be shared and performed by multiple devices. Alternatively, processes described as the ones that are respectively performed by different devices may be performed by a device. In a computer system, what hardware configuration (server configuration) implements functions may be flexibly changed.

The disclosure may also be implemented as follows. A computer is supplied with a computer program having the functions described in the above-described embodiment, and one or more processors of the computer read out and run the program. Such a computer program may be provided to a computer with a non-transitory computer-readable storage medium connectable to a system bus of the computer or may be provided to a computer via a network. Examples of the non-transitory computer-readable storage medium include a disk or disc of any type, such as a magnetic disk (floppy (registered trademark) disk, a hard disk drive (HDD), or the like), an optical disc (a CD-ROM, a DVD, a Blue-ray disc, or the like), a read only memory (ROM), a random access memory (RAM), an EPROM, an EEPROM, a magnetic card, a flash memory, an optical card, and a medium of any type suitable for storing electronic instructions.

What is claimed is:

1. An information processing apparatus comprising a processor configured to acquire a speech including a request of a user, specify one or multiple devices and at least two functions to be executed by the one or multiple devices, for realizing the request of the user based on the acquired speech of the user, and cause the one or multiple devices to execute the at least two functions, wherein the processor is further configured to:

determine whether a level of risk each of the at least two functions poses to a vehicle are higher than or equal to a predetermined level, and when the level of risk of each of the at least two functions are higher than or equal to the predetermined level, output information prompting the user to determine whether to execute the at least two functions, and wherein the at least two functions comprise changing a fragrance atomized into the vehicle and changing a drive mode.

2. The information processing apparatus according to claim 1, wherein:

the user is an occupant of the vehicle; and the one or multiple devices are one or multiple in-vehicle devices mounted on the vehicle.

3. The information processing apparatus according to claim 1, wherein the one or multiple devices are devices installed in a facility concerned with the user.

4. The information processing apparatus according to claim 1, wherein the processor is further configured to, when the processor determines that at least any one of the at least two functions is not executable, output information proposing an alternative for satisfying the request of the user.

5. The information processing apparatus according to claim 4, wherein the processor is further configured to, when at least any one of the at least two functions is already executed, determine that the at least any one of the at least two functions is not executable.

6. An information processing method that is executed by a computer, the information processing method comprising:

acquiring a speech including a request of a user;

specifying one or multiple devices and at least two functions to be executed by the one or multiple devices, for realizing the request of the user based on the acquired speech of the user; and causing the one or multiple devices to execute the at least two functions, wherein the information processing method further comprises:

determining whether a level of risk each of the at least two functions poses to a vehicle are higher than or equal to a predetermined level, and when the level of risk of each of the at least two functions are higher than or equal to the predetermined level, outputting information prompting the user to determine whether to execute the at least two functions, and wherein the at least two functions comprise changing a fragrance atomized into the vehicle and changing a drive mode.

7. The information processing method according to claim 6, wherein:

the user is an occupant of the vehicle; and the one or multiple devices are one or multiple in-vehicle devices mounted on the vehicle.

8. The information processing method according to claim 6, wherein the one or multiple devices are devices installed in a facility concerned with the user.

9. The information processing method according to claim 6, wherein, when it is determined that at least any one of the at least two functions is not executable, information proposing an alternative for satisfying the request of the user is output.

10. The information processing method according to claim 9, wherein, when at least any one of the at least two functions is already executed, it is determined that the at least any one of the at least two functions is not executable.

11. A non-transitory storage medium storing instructions that are executable by one or more processors and that cause the one or more processors to perform an information processing method comprising:

acquiring a speech including a request of a user;

specifying one or multiple devices and at least two functions to be executed by the one or multiple devices, for realizing the request of the user based on the acquired speech of the user; and causing the one or multiple devices to execute the at least two functions, wherein the information processing method further comprises:

determining whether a level of risk each of the at least two functions poses to a vehicle are higher than or equal to a predetermined level, and when the level of risk of each of the at least two functions are higher than or equal to the predetermined level, outputting information prompting the user to determine whether to execute the at least two functions, and wherein the at least two functions comprise changing a fragrance atomized into the vehicle and changing a drive mode.

12. The non-transitory storage medium according to claim 11, wherein:

the user is an occupant of the vehicle; and the one or multiple devices are one or multiple in-vehicle devices mounted on the vehicle.

13. The non-transitory storage medium according to claim 11, wherein the one or multiple devices are devices installed in a facility concerned with the user.

14. The non-transitory storage medium according to claim 11, wherein, when it is determined that at least any one of the at least two functions is not executable, information proposing an alternative for satisfying the request of the user is output.

15. The information processing apparatus according to claim 1, wherein the processor is further configured to output command information to the one or more devices without prompting the user when the level of risk of each of the at least two functions is below the predetermined level.

16. The information processing method according to claim 6, further comprising outputting command information to the one or more devices without prompting the user when the level of risk of each of the at least two functions is below the predetermined level.

17. The non-transitory storage medium according to claim 11, wherein the information processing method further comprises outputting command information to the one or more devices without prompting the user when the level of risk of each of the at least two functions is below the predetermined level.

* * * * *